United States Patent [19]

Liebermann et al.

[11] E Patent Number: Re. 32,552

[45] Reissued Date of Patent: Dec. 1, 1987

[54] GASEOUS IMPURITY DETECTOR EMPLOYING CORONA DISCHARGE PHENOMENON

[76] Inventors: Leonard Liebermann, 2644 Ellentown Rd., La Jolla, Calif. 92037; Stanley H. Lai, 4164 Hill St., San Diego, Calif. 92107

[21] Appl. No.: 206,727

[22] Filed: Nov. 14, 1980

Related U.S. Patent Documents

Reissue of:

[64] Patent No.: 3,742,475
Issued: Jun. 26, 1973
Appl. No.: 124,794
Filed: Mar. 16, 1971

[51] Int. Cl.[4] ..... G08B 21/00

[52] U.S. Cl. ..... 340/632

[58] Field of Search ..... 340/632, 633, 605; 250/324, 325, 326, 426, 427; 324/455, 460, 459, 464, 465, 468, 119; 73/40.7; 315/98, 108, 169.1; 23/232 E; 422/98; 313/93, 210, 214, 216

[56] References Cited

U.S. PATENT DOCUMENTS

| | | | |
|---|---|---|---|
| 1,406,858 | 2/1922 | Henricks | 313/216 X |
| 2,944,178 | 7/1960 | Lafferty | 313/214 |
| 3,345,562 | 10/1967 | Rockwell | 324/119 |
| 3,439,261 | 4/1969 | Loh et al. | 324/464 |
| 3,460,125 | 8/1969 | Liebermann et al. | 340/632 |
| 3,728,615 | 4/1973 | Hill et al. | 324/464 |

OTHER PUBLICATIONS

"British Corona Triode", *Electronics*, Mar., 1956.

Chemical Abstracts, vol. 68, 1968; 65473e "Use of a Negative Corona Discharge for Detecting Gases" by Partispanyan et al.; Guzovikhromatogr, No. 3, 61-6 (1965) (Russ.).

Physical Review, vol. 72, No. 1, Aug. 15, 1947; "Negative Corona In Freon-Air Mixtures" by Weissler and Mohr, Apr. 7, 1947, pp. 289--294.

*Primary Examiner*—James L. Rowland
*Assistant Examiner*—Jeffery A. Hofsass
*Attorney, Agent, or Firm*—Pennie & Edmonds

[57] ABSTRACT

A method [is disclosed] of detecting gaseous impurities, particularly halogens, in an ambient atmosphere by repeatedly pulsing a pair of electrodes disposed in that atmosphere with a voltage sufficient to cause a corona discharge in the continuous corona region, and detecting the average (d.c.) current component of such discharge, changes in which correspond to changes in the concentration of such gaseous impurities. Apparatus [is disclosed] for detecting such impurities in concentrations as low as 1 ppm.

12 Claims, 5 Drawing Figures

GASEOUS IMPURITY DETECTOR EMPLOYING CORONA DISCHARGE PHENOMENON

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the detection of gaseous impurities in an ambient atmosphere such as air by the use of a pulsed corona discharge.

2. Description of the Prior Art

The effects of impurities on the electrical characteristics of gaseous discharges have been recognized for some time, and various discharge phenomena have been employed in the detection of impurities. For the most part, the electrical phenomena involved in different detection methods are not well enough understood so that one such phenomenon can be predicted from knowledge of others. There is no satisfactory unifying theory capable of describing gaseous discharges in all regions and under all conditions, and hence little basis exists for predicting the results of a given test or experiment.

Known detectors whose operation involves electrical discharge phenomena include that of Seitz (U.S. Pat. No. 2,640,870), a detector principally for traces of nitrogen in argon by a constant, high intensity, high current arc in which variations in power dissipation are measured to ascertain the impurity concentration. U.S. Pat. Nos. 1,070,556 to Strong and 2,932,966 to Grindell relate to apparatus for detecting smoke. The former uses an a.c. driven spark discharge arrangement, where sparking between the electrodes occurs in the presence of smoke; the latter employs an electrostatic precipitator modified to include a collector electrode for collecting the charged smoke particles so that a net ion flow proportional to impurity concentration may be measured. U.S. Pat. No. 2,550,498 to Rice describes a detector based on ion formation caused by heating of impurities by a hot platinum element, using an alternating or unidirectional voltage source. Also relevant is an article by Pitkethyl (Analytical Chemistry, August 1958, Vol. 30, No. 8, pp. 1309–1314) which describes a method of gas chromatography employing d.c. discharge detectors. A d.c.-powered leak detection system employing a hot ion source is disclosed in U.S. Pat. No. 3,009,074. A method of detecting rare gases is disclosed in U.S. Pat. No. 2,654,051 to Kenty, in which a d.c. discharge is employed and voltage fluctuations measured.

Other known patents include Lovelock, U.S. Pat. No. 3,046,396, (a d.c. discharge is employed in the detection of helium) and Stokes, U.S. Pat. No. 2,933,676 (a d.c. discharge is used in a manometer). Also see U.S. Pat. Nos. 268,908; 1,231,045; 1,421,720; 1,990,706; 2,783,647; 2,996,661; 3,022,498; 3,065,411; 3,071,722; 3,076,139; 3,144,600; 3,277,364 and 3,339,136. Also, see British Pat. No. 826,195 and the following articles: "Effect of $CCl_4$ Vapor on the Dielectric Strength of Air," Rodine and Herb, Physical Review, Mar. 15, 1937, pp. 508 et seq; "Magnetic-Electric Transducer," K. S. Lion, Review of Scientific Instruments, Vol. 27, No. 4, Apr. 1956, pp. 222 et seq; "A Radio Frequency Detector for Gas Chromatography," Karmen and Bowman, Gas Chromatography, Second International Symposium Held Under the Auspices of the Instrument Society of America, June 1959, pp. 65–73, (Academic Press, New York and London, 1961).

The above mentioned detectors are not, by and large, satisfactorily capable of detecting halogen gases in low concentrations, or of indicating quantitatively the concentration of a known impurity at low or high levels with any degree of accuracy. Detection of halogens in low concentration is particularly important in inspecting for leaks from refrigeration systems employing Freon and similar halogen-containing refrigerants. Halogen detection is also accomplished according to the teachings in U.S. Pat. Nos. 3,460,125 and 3,559,049 issued to the present applicants. Detection is carried out in accordance with both patents based on changes in the spark breakdown potential of the test atmosphere in the presence of impurities, in distinct contrast to the method described herein which utilizes effects occurring within the continuous corona discharge region and does not involve spark breakdown.

SUMMARY OF THE INVENTION

In accordance with the invention, gaseous impurities are detected by providing a pulsed corona discharge in the continuous corona region, between a pair of electrodes disposed in the atmosphere under test, and measuring the d.c. signal component of the electrode pair. This d.c. signal obtained in accordance with the invention is a highly sensitive indicator of the presence and concentration of gaseous impurities including substances which behave like gaseous impurities such as air-borne liquids and solids.

Inasmuch as some confusion exists as to the various characteristic regions encountered as the voltage across an electrode pair is varied, reference is made for definitional purposes to an article by Weissler and Mohr entitled "Negative Corona in Freon-Air Mixtures," Physical Review, Aug. 15, 1947, Vol. 72, No. 4:

"The characteristic curves of any point-to-plane corona, plotting the gap current against the applied potential, are made up of three ranges of specific interest. The 'dark-current' range occurs well below the onset of any visible corona, and the sharper the point the narrower this range will be. It depends most strongly on the first Townsend coefficient $\alpha$ and to a lesser degree on the secondary mechanism near the point. The latter is caused chiefly by the efficiency of liberation of electrons from the point surface by positive ion bombardment and also to some photoelectric liberation from the cathode. The currents in this range vary from $10^{-14}$ ampere to about $10^{-8}$ ampere. Photo-ionization and excitation in the gas as well as space-charge distortion of the static electric fields are negligible.

"In the 'intermittent-corona' range the currents vary from $10^{-8}$ to about $10^{-6}$ ampere, and the corona becomes visible. In addition to the coefficient $\alpha$, the secondary actions at the cathode point become more prominent. The most characteristic aspect of this range is the flickering or intermittent, visible corona. Associated with it are large current fluctuations at any fixed potential and transient space-charge pulses in the immediate vicinity of the point. Space-charge distortion of the electric field occurs intermittently. The corona is not self-sustaining and requires electrons from external ionizing sources to re-initiate it.

"The third range is that of the 'continuous corona' where the currents for a given potential are steady and reproducible and where the visible character is not erratic. The corona is self-sustaining, and the currents vary smoothly from about $10^{-5}$ ampere until this form of discharge is finally terminated by a disruptive spark or arc."

The method disclosed herein employs the continuous corona region of the discharge. While detection is feasible with positive corona, sensitivity is much higher employing negative corona; hence the latter is preferred.

Weissler and Mohr, describing the effect of halogens on a discharge produced by constant electrode voltage, found that:

"With mixtures of from 0.1 to one percent of [freon] *Freon* in dry air the only notable difference occurred with the appearance in the intermittent corona region of what might be termed a hysteresis effect."

In other words, no effects were noted in the continuous corona region, and only a large time scale (of the order of minutes) hysteresis effect was found in the intermittent corona region.

It is all the more surprising, therefore, that voltage pulses in the continuous corona region provide a discharge which is extremely sensitive to Freon concentrations as low as one part per million (ppm).

Equally surprising is the accuracy of the method of the invention in measuring impurity concentration at low levels, as opposed to simply detecting impurities; the d.c. electrode current is an accurate indicator of such concentration.

In a negative corona detector in accordance with the invention, concentrations as low as 1 ppm Freon 12 ($CCl_2F_2$) may be detected. Even lower concentrations of other Freons are detectable. In general, electropositive gases such as carbon monoxide, methane, propane, and the like increase the d.c. corona current, whereas electronegative gases such as Freon 12 decrease it. Sensitivity to electropositive gases is adequate for detection of 1,000 ppm on the average. The invention is well suited for the precise measurement of carbon monoxide in internal combustion engine exhaust gas, where it is present in concentrations of about 1 to 10 percent. Carbon monoxide as so measured is a good indication of combustion efficiency.

For optimal sensitivity, an asymmetrical electrode pair is employed in accordance with the invention. Preferably, a sharply pointed electrode opposite a hemispherical plane electrode is used, free of impurities.

The continuous corona region is essentially current-defined, so that impedance of a specific electrode pair determines the voltage range appropriate for detection in accordance with the invention. For an electrode impedance of 50 megohms, for example, a voltage range of about 1,800 to 2,700 volts may be employed, giving a peak current of about 40 microamperes. Electrode impedance is defined as the ratio of peak pulse voltage to peak discharge current under the operating conditions (i.e. pulse repetition rate) employed for detection.

The particular physical properties of the discharge determinitive of minimum and maximum pulse separation are not fully understood at this time. Sixty-cycle alternating current permits detection in accordance with the invention, yet sensitivity is only one-tenth as great as when the discharge is produced by sub-millisecond pulses about 10 milliseconds apart.

DESCRIPTION OF THE DRAWINGS

Preferred embodiments of the invention will be described in connection with the accompanying drawings, in which.

DESCRIPTION OF PREFERRED EMBODIMENTS

Figure 1:
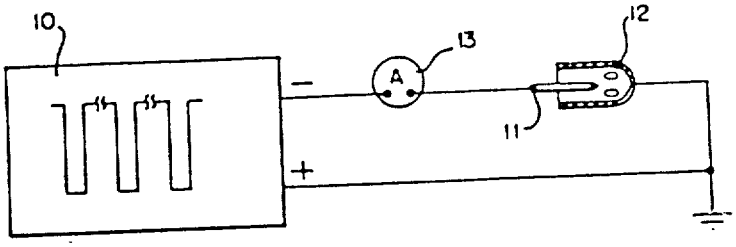
FIG. 1 is a block circuit diagram of a detector in accordance with the invention.

As shown in FIG. 1, a pulse source 10 is connected to supply negative-going pulses to the pointed one 11 of a pair of electrodes, the other of which 12 is preferably a small, hemispherical surface disposed as indicated about point electrode 11. The hemispherical electrode is grounded.

The pointed electrode 11 may be formed of fine wire, i.e. one to three mils in diameter preferably formed of a highly refractory metal such as tungsten. The interior of the hemispherical electrode 12 should be free of all projections and edges which might otherwise cause sparking. The interior radius of hemispherical electrode 12 is 3/32 inch, and it may be provided with holes or slits to admit the atmosphere under test into the corona region.

Voltage source 10 should be capable in this embodiment of supplying negative voltage pulses between about 1,800 and 2,700 volts peak. Preferably, the pulse width may range from a few microseconds up to about 300 microseconds, with a pulse repetition rate of the order of 100 p.p.s. The pulse length and separation are not critical, and no sharp changes in detection characteristics will result if they are varied somewhat. The pulse rate must be fast enough to obtain adequate sampling in the particular application intended (i.e. usually at least 10 p.p.s.) and should be slow enough to avoid a duty cycle greater than about 10 percent. The duty cycle is preferably of the order of 1 percent.

An ammeter 13 capable of measuring average current is provided in series with the voltage source and the electrode pair for measuring the average current, or d.c. current component, of the electrode pair. This d.c. current is in accordance with the invention a sensitive measure of impurity concentration. The ammeter should be capable of indicating in the microampere range.

Figure 4:
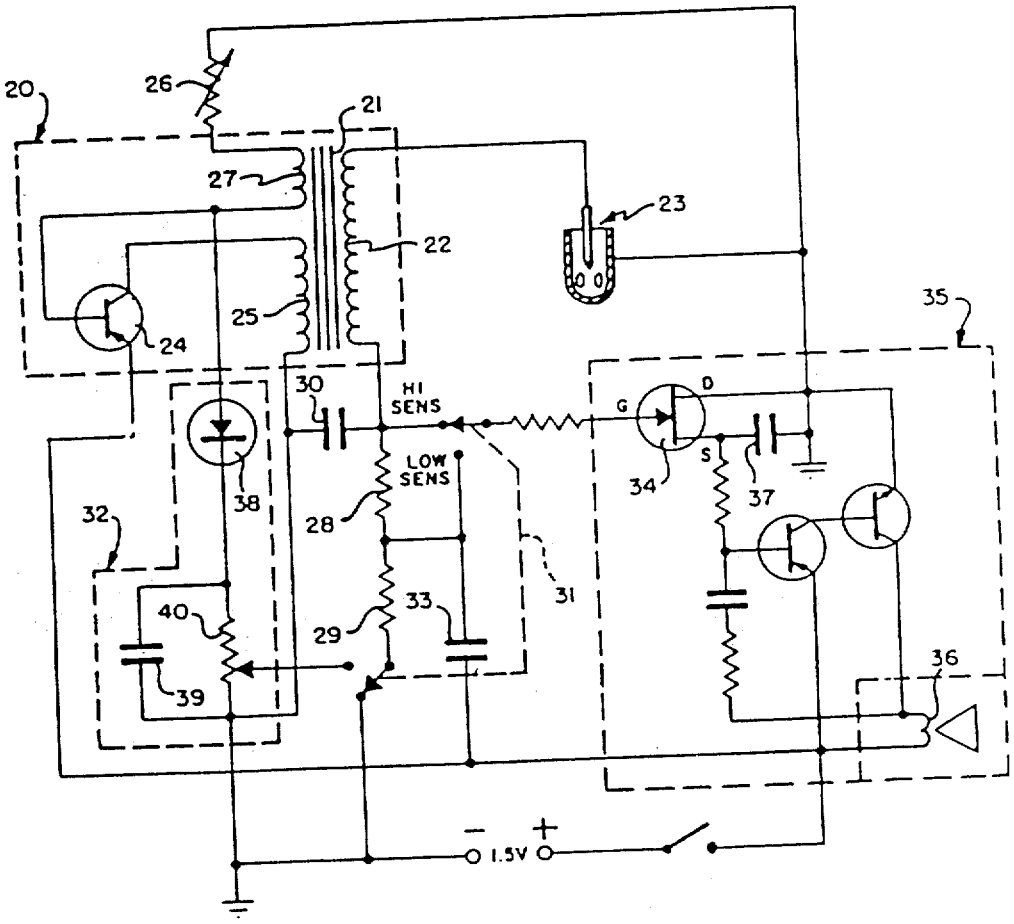
FIG. 4 is a schematic circuit diagram of a preferred embodiment of the invention.
Figure 2:
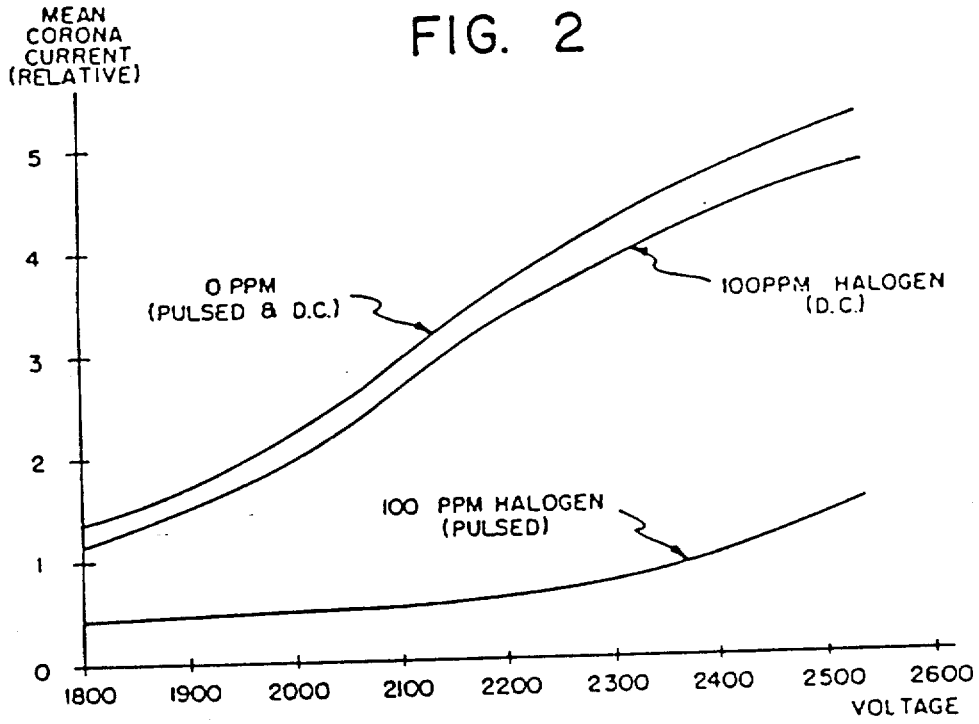
FIG. 2 is a graph of the mean corona current versus electrode voltage for d.c. and pulse electrode voltages.

FIG. 2 illustrates the detection capability of the device of FIG. 1 in comparison with that of a similar device employing a d.c. electrode voltage supply. The vertical scale is plotted in terms of numbers simply to illustrate the relative changes in mean corona current under d.c. and pulsed voltage drives. For this purpose, the tests illustrated by FIG. 2 were carried out in dry air using Freon 12 as the impurity. In the absence of impurity (the zero ppm curve), the mean corona current as a function of voltage was plotted for both the pulse and d.c. conditions. Although the actual mean corona current is obviously different for the pulsed and d.c. drive condition, the two curves were plotted as one by introducing a scale factor for purposes of comparison. The same scale factor was used in plotting the curves for the pulsed and d.c. drive conditions at 100 ppm impurity concentration, so that these curves accurately indicate the comparative detection capability of [the invention and, say, a device such as that disclosed by Weissler and Mohr, supra] *an embodiment of the invention substantially as shown in FIG. 4 and the same detector including a rectifier and capacitor, across the electrodes.* The two curves plotted for 100 ppm impurity concentration clearly demonstrate the much greater detection capability of the method of the invention employing a pulsed electrode voltage.

The precise explanation for this significantly improved result is not fully understood; however, it may result from the presence of heavy ions such as $Cl^-$ and $F^-$. These ions form a space charge region about the negative electrode. In a d.c. field, the space charge first tends to diminish the discharge current; then the ion cloud moves away from the negative electrode, again permitting current flow. Under pulsed excitation, however, lack of sufficient time for movement of the ion cloud from the negative electrode may enhance the effect of these heavy ions, permitting detection and measurement at lower impurity levels than were previously feasible.

From the point of view of the electrode voltage and current alone, it is theoretically not necessary to measure the mean corona current to obtain detection in accordance with the invention; peak corona could be measured under the pulse drive conditions described herein and would theoretically provide [as] *an* equally sensitive detection. However, when employing an a.c. (e.g. pulsed) electrode drive, stray capacitance contributes spurious currents to the measured value. It is therefore necessary to measure corona current in a manner which will exclude these spurious contributions and include only the true corona current. This is done in accordance with the invention by measuring the mean corona current, since the corona current is intrinsically rectified, cancelling out the effects of stray currents.

Figure 3:
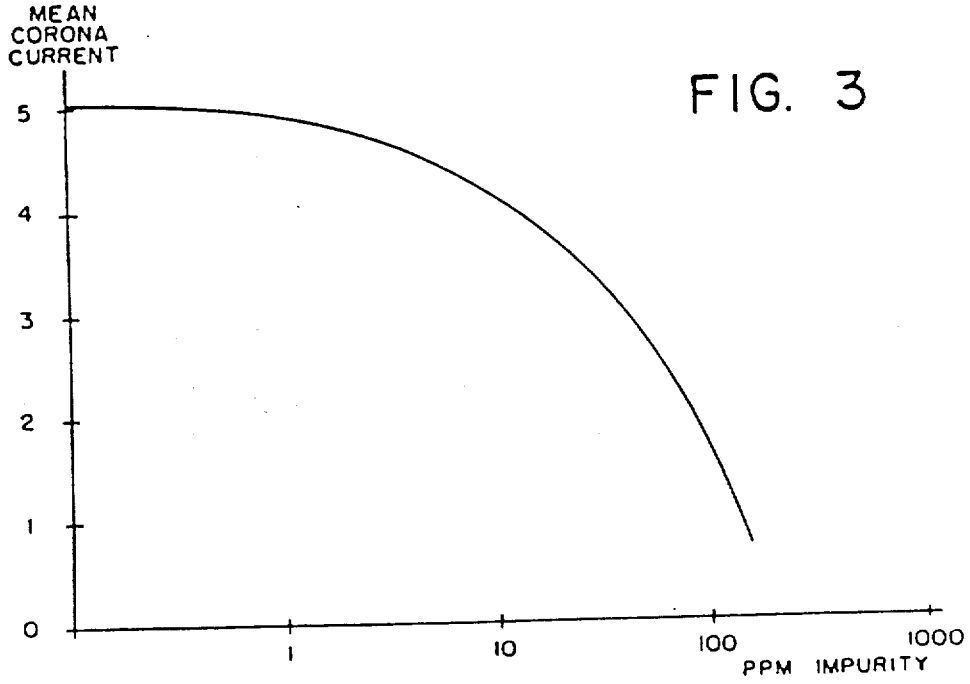
FIG. 3 is a graph of mean corona current versus Freon 12 concentration in parts per million.

FIG. 3 is a graph (with the horizontal scale plotted logarithmically) of mean corona current measured by the device of FIG. 1 versus Freon 12 concentration in parts per million (by volume).

FIG. 4 is a schematic diagram of a preferred embodiment of the invention wherein an audible output signal is provided which produces a series of clicks. As in a Geiger counter, the frequency of the clicks increases dramatically proportionally to the increased concentration sensed by the instrument, providing an extremely efficient method for locating a leak, for example, from a refrigeration system.

The voltage source in FIG. 4 is provided by a blocking oscillator 20 including an output transformer 21, the output winding of 22 of which is connected to supply negative-going pulses to the pointed electrode of electrode pair 23. The blocking oscillator includes a transistor 24, the collector-to-emitter output of which is applied to input winding 25 of the transformer. Variable limiting resistor 26 is connected in series with the feedback winding 27 of the blocking oscillator in order to control the maximum electrode voltage at a value below spark breakdown. This is to prevent spark breakdown from occurring at the highest impurity concentrations expected to be encountered as well as in an impurity-free atmosphere. As the battery deteriorates, resistor 26 is varied to maintain substantially constant amplitude pulses at the electrodes, manifested (for example) by a constant clicking rate in the absence of impurities.

For measuring mean corona current, an R-C circuit formed of resistors 28 and 29 in parallel with a capacitor 30 is connected between output winding 22 and ground. The two-pole, two-position switch 31 is employed to switch the sensitivity of the device of a high sensitivity range in which the full output of the R-C circuit is supplied to the audio circuit, or a low-sensitivity range wherein only a portion of the output voltage is supplied to the audio circuitry. When switch 31 is connected in the low sensitivity position, the output voltage is tapped off between resistors 28 and 29. An additional capacitor 33 is provided as a high frequency shunt in the low sensitivity position.

The output voltage from the R-C circuit is fed to the gate of a FET 34, so that the positive gate voltage in the absence of impurities is sufficient to nearly produce pinch-off. The source-drain circuit of FET 34 is connected in the feedback loop of a two-transistor multivibrator 35 to provide control of the oscillatory frequency of the multivibrator. The output of the mutlivibrator is fed through a speaker 36 which produces a series of clicks, preferably sounding like a Geiger counter, described above.

When FET 34 is near pinch-off, the oscillatory frequency of multivibrator 35 is low. With increasing concentrations of impurity, as shown in FIG. 3, the mean corona current and hence the output voltage from the R-C circuit applied to the gate of FET 34 drops, causing the frequency of oscillator 35 to rise. Hence, the clicking rate, or at higher frequencies the pitch, of the audio signal produced by speaker 36 clearly and dramatically indicates the existence and severity of a leak. A capacitor 37 may be provided between the source terminal of FET 34 and ground to improve the tonal quality of the audio output signal. In the low sensitivity position of switch 31, there may not be sufficient voltage applied to the gate of FET 34 to nearly obtain pinch off. In order to produce a sufficiently low frequency audio output signal, therefore, an auxiliary bias supply 32 is provided which takes advantage of the high voltage pulses appearing on feedback winding 27 of the blocking oscillator. Bias supply 32 includes a diode 38 in series with a parallel R-C circuit formed by capacitor 39 and resistor 40, the variable tap of which constitutes one terminal of sensitivity switch 31, thereby providing additional d.c. bias current in the low sensitivity position to the gate terminal of the FET.

In the embodiment shown, the value of variable limiting resistor 26 is about 1,000 ohms, while in the high sensitivity position of switch 31, resistor 28, 29 and capacitor 39 have values of 13 megohms and 0.01 microfarads, respectively. The time constant of the R-C circuit should be several times longer than the period between pulses.

Figure 5:
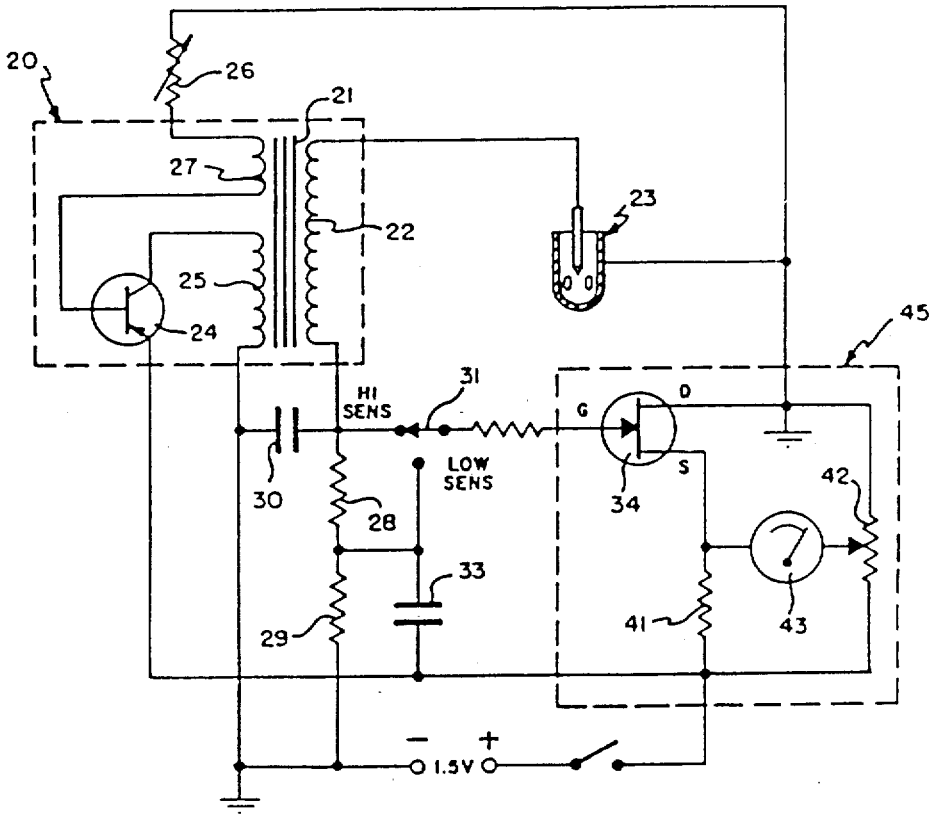
FIG. 5 is a schematic circuit diagram of an alternative embodiment of the invention.

FIG. 5 illustrates an embodiment of the invention similar to that of FIG. 4 but with a visual rather than an audible output, permitting more accurate measurement of impurity concentration. The unnumbered elements in FIG. 5 may be identical to those described in connection with FIG. 4. FET 34 is connected as one arm of a Wheatstone bridge circuit 45, the other arms being formed by resistor 41 and the two sides, divided by the variable tap, of potentiometer 42. In operation, potentiometer 42 is adjusted to give zero output reading on voltmeter 43, which may be calibrated directly in terms of impurity concentration. The inertial time constant of voltmeter 43 should be several times longer than the time between successive pulses in the absence of impurities, to provide a constant indication for constant impurity concentration.

It will be appreciated by those skilled in the art that various changes and modifications may be made to the above described preferred embodiments without departing from the scope and spirit of the invention as defined by the claims herein.

We claim:

[1. A method of detecting gaseous impurities in an ambient atmosphere, comprising applying voltage pulses across a pair of electrodes disposed in such atmosphere, the voltage being sufficient to cause a corona discharge across said electrodes in the continuous corona region; and detecting the mean corona current of said discharge, which current varies with impurity concentration.]

[2. A method of detecting gaseous impurities in an ambient atmosphere, comprising applying voltage pulses across a pair of electrodes disposed in such atmosphere, the voltage thereof being sufficient to cause a negative corona discharge across said electrodes in the continuous corona region and said pulses being between about 1 to 300 microseconds in length at a pulse rate greater than 10/second, but not so great as to exceed 10 percent duty cycle; and detecting the mean corona current of said discharge, which current varies with impurity concentration.]

[3. A method of detecting gaseous impurities in an ambient atmosphere comprising applying voltage pulses across an asymmetrical electrode pair sufficient in magnitude to cause a corona discharge thereacross in the continuous corona region; and measuring the peak true corona discharge current, which is representative of such impurity concentration.]

4. Apparatus for detecting [gaseous] *halogen* impurities in an ambient atmosphere comprising:

an asymmetrical electrode pair disposable in such ambient atmosphere;

a *portable battery-operable* source of voltage pulses *including an oscillator* connected to the electrode pair, the voltage of said pulses being sufficient to cause a *negative* corona discharge across the electrode pair in the continuous corona region; and means for indicating the mean corona current of said discharge, which is representative of the concentration of such impurity.

5. Apparatus as defined in claim 4 including a limiting resistor for preventing spark breakdown under all impurity [concentration] *concentrations* occurring in such ambient atmosphere.

[6. Apparatus for detecting gaseous impurities in an ambient atmosphere comprising:

an asymmetrical electrode pair disposable in such ambient atmosphere, one electrode of said electrode pair being pointed;

a source of voltage pulses connected to the electrode pair, the voltage of said pulses being sufficient to cause a corona discharge across the electrode pair in the continuous corona region and said pulse source providing negative-polarity pulses to the pointed electrode having a pulse width of about one to 300 microseconds at a pulse rate greater than 10/second but not so great as to exceed 10 percent duty cycle; and means for indicating the mean corona current of said discharge, which is representative of the concentration of such impurity.]

[7. Apparatus as defined in claim 6 wherein said indicating means includes an R-C circuit in series with the electrode pair for providing an output voltage proportional to the time-average discharge current.]

[8. Apparatus as defined in claim 7 wherein said indicating means includes a voltage-controlled multivibrator connected to drive a speaker and connected to be controlled by said output voltage, whereby the frequency of the speaker output is indicative of impurity concentration.]

[9. Apparatus as defined in claim 7 wherein said indicating means includes an active amplifier responsive to said output voltage, connected in circuit with an indicating meter for indicating impurity concentration.]

*10. Apparatus for detecting halogen impurities in an ambient atmosphere comprising:*

*an asymmetrical electrode pair disposable in such ambient atmosphere;*

*a source of voltage pulses connected to the electrode pair, the voltage of said pulses being sufficient to cause a negative corona discharge across the electrode pair in the continuous corona region; and*

*means for indicating the mean corona current of said discharge, which is representative of the concentration of such impurity; wherein*

*said indicating means includes an R-C circuit in series with the electrode pair for providing an output voltage proportional to the time-average discharge current, said source of voltage pulses being connected to the electrode pair to produce a negative corona discharge thereacross;*

*said asymmetrical electrode pair includes a pointed electrode disposed opposite a substantially hemispherical electrode provided with openings to admit the atmosphere under test into the corona region; and*

*said source of voltage pulses includes a blocking oscillator having an output transformer, said output transformer including an output winding, one side of said output winding being connected in circuit with the pointed electrode and the other side of said output winding being connected in circuit with the substantially hemispherical electrode through said R-C circuit.*

*11. Apparatus as defined in claim 10 wherein the voltage pulses produced by said source thereof have a voltage between about 1800 and 2700 volts peak.*

*12. Apparatus as defined in claim 10 wherein the substantially hemispherical electrode has an interior radius of about 3/32 inch and the pointed electrode is formed of a fine wire.*

• • • • •